US005771075A

United States Patent [19]
Rim et al.

[11] Patent Number: 5,771,075
[45] Date of Patent: Jun. 23, 1998

[54] AUDIO/VIDEO SYNCHRONIZER

[75] Inventors: Chai Yeol Rim; Yong Hoon Kim, both of Seoul, Rep. of Korea

[73] Assignee: LG Electronics Inc., Seoul, Rep. of Korea

[21] Appl. No.: 567,689

[22] Filed: Dec. 5, 1995

[30] Foreign Application Priority Data

Dec. 8, 1994 [KR] Rep. of Korea ................ 33332/1994
Jul. 14, 1995 [KR] Rep. of Korea ................ 20847/1995

[51] Int. Cl.$^6$ ................................................ H04N 9/475
[52] U.S. Cl. ................................ 348/512; 348/845.3
[58] Field of Search ................................ 348/845.3, 500, 348/512, 518, 536; 375/354

[56] References Cited

U.S. PATENT DOCUMENTS

| | | | |
|---|---|---|---|
| 5,287,182 | 2/1994 | Haskell et al. | 348/500 |
| 5,521,927 | 5/1996 | Kim et al. | 348/845.3 |
| 5,566,089 | 10/1996 | Hoogenboom | 348/845.3 |
| 5,588,029 | 12/1996 | Maturi et al. | 375/364 |
| 5,598,352 | 1/1997 | Rosenau et al. | 348/515 |
| 5,598,415 | 1/1997 | Nuber et al. | 348/465 |

Primary Examiner—Tommy P. Chin
Assistant Examiner—Nhon T. Diep
Attorney, Agent, or Firm—John P. White; Cooper & Dunham LLP

[57] ABSTRACT

An audio/video synchronizer for a digital TV is disclosed including: a system decoder for parsing an input data packet and outputting compressed data of audio and video signals and PTS/DTS and PCR or SCR; an audio/video decoder for decoding the compressed data output from the system decoder, outputting a DTS for the video or audio frame to be decoded, and outputting a decoding ready signal indicating that decoding of the video or audio frame is finished, and a PTS of corresponding data; a frame memory for storing the audio/video data from the audio/video decoder; a clock generator for dividing an input clock into a predetermined value to generate horizontal and vertical sync signals and a PCM clock of the audio signal; an audio/video playing portion for playing the data decoded in the audio/video decoder according to the decoding ready signal in synchronization with the vertical and horizontal sync signals from the clock generator and the audio PCM clock, and outputting the PTS of a picture played and the audio frame; and a PTS/DTS controller for comparing the PTS input from the audio/video playing portion or the DTS from the audio/video decoder with the PCR or SCR input from the system decoder, thereby controlling the audio/video decoder and audio/video playing portion according to their difference.

4 Claims, 7 Drawing Sheets

AUDIO/VIDEO SYNCHRONIZER

BACKGROUND OF THE INVENTION

The present invention relates to a digital television, and more particularly, to an audio/video synchronizer for a digital television which is capable of accurately synchronizing a video and audio signal using information loaded and transmitted on a data packet in encoding.

Generally, a digital television displays images by expanding video and audio data transmitted after compressed in units of frame. Here, the amount of the video and audio data compressed and transmitted is not the same for every frame. For this reason, the precise output of audio signal for video signal cannot be expected unless the video and audio signals are synchronized on their reception side.

In an MPEG system, for synchronization, a program clock reference (PCR) or a system clock reference (SCR) indicative of the current time is loaded on its counter as an initial value. The PCR and SCR are counted at clock frequencies of 27 MHz and 90 KHz for MPEG2 and MPEG1 systems, respectively.

A counted value is called a system time clock (STC). A time to decode a video picture or audio frame is indicated by a decoding time stamp (DTS) during which decoding is supposed to be performed.

A time to display and play a video picture or audio frame is represented by a presentation time stamp (PTS) during which they are displayed or played. Here, the PTS, DTS, SCR and PCR are signals loaded on a data packet from their transmission side. The MPEG system synchronizes audio and video signals using them.

Figure 1:
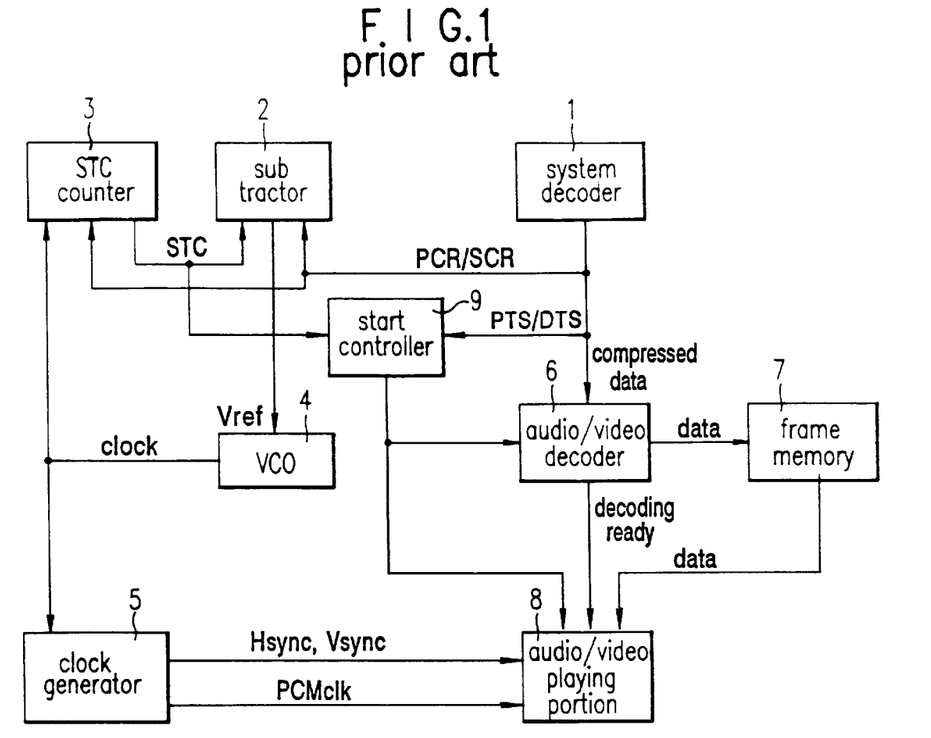
FIG. 1 is a block diagram of a conventional audio/video synchronizer for a digital TV.

A conventional system for synchronizing audio and video signals, as shown in FIG. 1, includes a system decoder 1 for parsing a system data packet and outputting compressed data of the audio and video signals and PTS/DTS and PCR or SCR, a voltage-controlled oscillator (VCO) 4 for generating a clock of 27 MHz for MPEG2 or 90 KHz for MPEG1, and controlling a generated frequency according to the magnitude of a reference voltage Vref, an STC counter 3 for initializing the PCR or SCR output from system decoder 1 at the initial operation of the system, counting it using the output clock of VCO 4, and outputting the STC, a subtractor for comparing the PCR or SCR output from system decoder 1 with the STC output from STC counter 3 and varying the reference voltage of VCO 4 so that an error, that is, the difference between the PCR or SCR and STC is reduced, a clock generator 5 for dividing the clock output from VCO 4 to generate horizontal and vertical sync signals Hsync and Vsync and PCM clock PCMclk of audio signal, an audio/video decoder 6 for decoding the compressed data output from system decoder 1 and outputting a decoding ready signal indicating that decoding is finished, a frame memory 7 for storing the audio/video data decoded in audio/video decoder 6, an audio/video playing portion 8 for displaying the video picture data from frame memory 7 according to the decoding ready signal in synchronization with the vertical and horizontal sync signals from clock generator 5, and playing the audio frame data in synchronization with the audio PCM clock, and a start controller 9 for comparing the STC from STC counter 3 and the PTS or DTS from system decoder 1 to control the operations of audio/video decoder 6 and audio/video playing portion 8 according to their difference.

The operation of the conventional audio/video synchronizer for a digital TV will be described below.

First, system decoder 1 outputs the compressed data of audio and video signals, DTS, PTS, and PCR or SCR. STC counter 3 counts the PCR or SCR by the clock output from VCO 4, and outputs the STC.

The STC output from STC counter 3 is compared with the PCR or SCR in subtractor 2 so that the magnitude of reference voltage Vref is controlled and thus the output frequency of VCO 4 is controlled to reduce the error, that is, the difference between the compared values. Here, the value input to VCO 4 is a value in which the output of subtractor 2 is converted into analog by a D/A converter (not shown). When the above-stated operation is performed, the same clock as that used in encoding on the transmission side is obtained.

With this clock, clock generator 5 divides it in a predetermined division value, to output horizontal and vertical sync signals Hsync and Vsync and PCM clock PCMclk of audio signal. At the same time, start controller 9 starts the operation of audio/video decoder 6 and audio/video playing portion 8.

Audio/video decoder 6 decodes the compressed data so that the restored audio/video data is stored in frame memory 7. The decoding ready signal indicating that decoding of a video/audio frame is finished is output to audio/video playing portion 8.

Audio/video playing portion 8 displays the decoded video data in synchronization with horizontal and vertical sync signals Hsync and Vsync output from clock generator 5, and plays the audio frame data in synchronization with audio PCM clock PCMclk.

Start controller 9 compares the STC from STC counter 3 with the PTS or DTS input from system decoder 1 in order to control the operations of audio/video decoder 6 and audio/video playing portion 8.

In the conventional audio/video synchronizer for a digital TV, an expensive VCO is used for clock control, increasing cost. In addition, a D/A converter for converting the output of a subtractor that applies a reference voltage to the VCO is required because the reference voltage for controlling the clock frequency of the VCO must be applied in analog form. Furthermore, the D/A converter's analog control may cause troubles such as drift. The VCO hinders the apparatus from becoming ASIC. The synchronization control of audio and video signals with a clock using a VCO makes impossible synchronization control by a separate clock variation. This confines the NPEG system's audio/video synchronization control.

SUMMARY OF THE INVENTION

Therefore, in order to overcome such problems, there is provided an audio/video synchronizer for a digital TV in which audio/video synchronization control is performed using SCR, PCR or PTS/DTS sent from the transmission side in a digital PTS/DTS controller, requiring no D/A converter and VCO used for clock control in prior art, enabling ASIC, and reducing production cost.

It is another object of the present invention to provide an audio/video synchronizer for a digital TV in which, using no VCO, a separate clock can be varied to control the synchronization of audio and video signals.

To accomplish the object of the present invention, there is provided one embodiment of an audio/video synchronizer for a digital TV comprising: a system decoder for parsing an input data packet and outputting compressed data of audio and video signals and PTS/DTS and PCR or SCR; an audio/video decoder for decoding the compressed data output from the system decoder, outputting a DTS for the video or audio frame to be decoded, and outputting a decoding ready signal indicating that decoding of the video or audio frame is finished, and a PTS of corresponding data; a frame memory for storing the audio/video data from the audio/video decoder; a clock generator for dividing an input clock into a predetermined value to generate horizontal and vertical sync signals and a PCM clock of the audio signal; an audio/video playing portion for playing the data decoded in the audio/video decoder according to the decoding ready signal in synchronization with the vertical and horizontal sync signals from the clock generator and the audio PCM clock, and outputting the PTS of a picture played and the audio frame; and a PTS/DTS controller for comparing the PTS input from the audio/video playing portion or the DTS from the audio/video decoder with the PCR or SCR input from the system decoder, thereby controlling the audio/video decoder and audio/video playing portion according to their difference.

For the object of the present invention, there is provided a second embodiment of an audio/video synchronizer for a digital TV comprising: a system decoder for parsing an input data packet and outputting compressed data of audio and video signals and PTS/DTS and PCR or SCR; an audio/video decoder for decoding the compressed data output from the system decoder, outputting a DTS for the video or audio frame to be decoded, and outputting a decoding ready signal indicating that decoding of the video or audio frame is finished, and a PTS of corresponding data; a frame memory for storing the audio/video data from the audio/video decoder; a clock generator for dividing an input clock according to a division control signal to generate horizontal and vertical sync signals and a PCM clock of the audio signal; an audio/video playing portion for playing the data decoded in the audio/video decoder according to the decoding ready signal in synchronization with the vertical and horizontal sync signals from the clock generator and the audio PCM clock, and outputting the PTS of a picture played and the audio frame; and a PTS/DTS controller for comparing the PTS input from the audio/video playing portion or the DTS from the audio/video decoder with the PCR or SCR input from the system decoder, and outputting the division control signal to the clock generator according to their difference thereby controlling clock division.

For another aspect of the present invention, there is provide an audio/video synchronizer for a digital TV comprising: a system decoder for parsing an input data packet and outputting compressed data of audio and video signals and PTS/DTS and PCR or SCR; an STC generator for receiving and counting PCR or SCR from the system decoder to thereby an STC value; an audio/video decoder for decoding the compressed data output from the system decoder, outputting a DTS for the video or audio frame to be decoded, and outputting a decoding ready signal indicating that decoding of the video or audio frame is finished, and a PTS of corresponding data; a frame memory for storing the audio/video data from the audio/video decoder; a clock generator for dividing an input clock according to a division value to generate horizontal and vertical sync signals and a PCM clock of the audio signal; an audio/video playing portion for playing the data decoded in the audio/video decoder according to the decoding ready signal in synchronization with the vertical and horizontal sync signals from the clock generator and the audio PCM clock, and outputting the PTS of a picture played and the audio frame to the PTS/DTS controller; and a PTS/DTS controller for comparing the PTS input from the audio/video playing portion or the DTS from the audio/video decoder with the STC input from the STC generator, thereby controlling the audio/video decoder and audio/video playing portion according to their difference.

For still another aspect of the present invention, there is provided an audio/video synchronizer for a digital TV comprising: a system decoder for parsing an input data packet and outputting compressed data of audio and video signals and PTS/DTS and PCR or SCR; an STC generator for receiving and counting PCR or SCR from the system decoder to thereby an STC value; an audio/video decoder for decoding the compressed data output from the system decoder, outputting a DTS for the video or audio frame to be decoded, and outputting a decoding ready signal indicating that decoding of the video or audio frame is finished, and a TS of corresponding data; a frame memory for storing the audio/video data from the audio/video decoder; a clock generator for dividing an input clock according to a division value to generate horizontal and vertical sync signals and a PCM clock of the audio signal; an audio/video playing portion for playing the data decoded in the audio/video decoder according to the decoding ready signal in synchronization with the vertical and horizontal sync signals from the clock generator and the audio PCM clock, and outputting the PTS of a picture played and the audio frame to the PTS/DTS controller; and a PTS/DTS controller for comparing the PTS input from the audio/video playing portion or the DTS from the audio/video decoder with the STC input from the STC generator, and outputting a division control signal according to their difference, thereby controlling clock control of the clock generator.

For yet another aspect of the present invention, there is provided an audio/video synchronizer for a digital TV comprising: a system decoder for parsing an input data packet and outputting compressed data of audio and video signals and PTS/DTS and PCR or SCR; an STC generator for receiving and counting PCR or SCR from the system decoder to thereby an STC value; an audio/video decoder for decoding the compressed data output from the system decoder, outputting a DTS for the video or audio frame to be decoded, and outputting a decoding ready signal indicating that decoding of the video or audio frame is finished, and a PTS of corresponding data; a frame memory for storing the audio/video data from the audio/video decoder; a clock generator for dividing an input clock according to a division value to generate horizontal and vertical sync signals and a PCM clock of the audio signal; an audio/video playing portion for playing the data decoded in the audio/video decoder according to the decoding ready signal in synchronization with the vertical and horizontal sync signals from the clock generator and the audio PCM clock, and outputting the PTS of a picture played and the audio frame to the PTS/DTS controller; and a PTS/DTS controller for comparing the PTS input from the audio/video playing portion or the DTS from the audio/video decoder with the STC input from the STC generator, thereby varying the input clock of the clock generator according to their difference.

DETAILED DESCRIPTION OF THE INVENTION

Hereinafter, preferred embodiments of an audio and video synchronizer for a digital TV will be described with reference to the attached drawings.

First Embodiment

Figure 2:
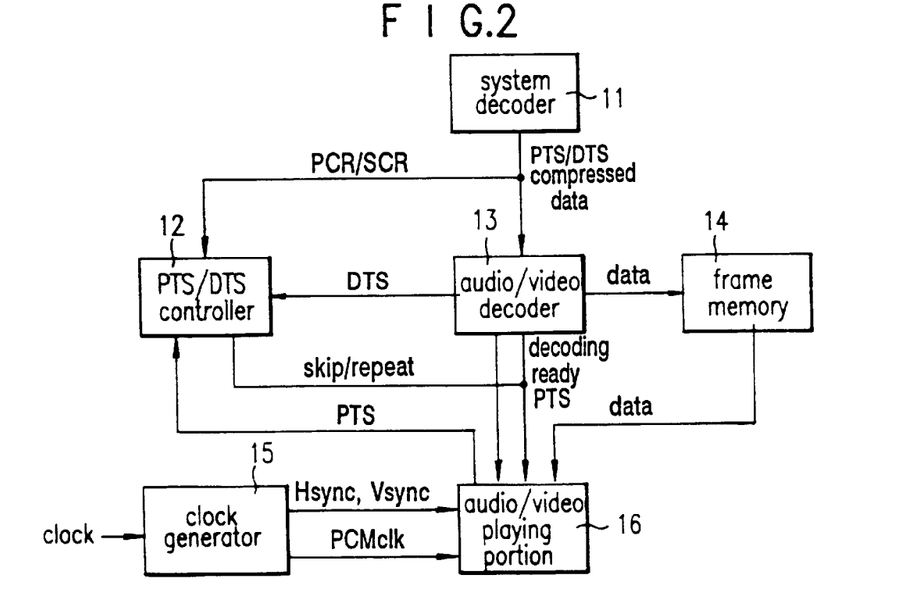
FIG. 2 is a block diagram of one embodiment of an audio/video synchronizer of the present invention.

Referring to FIG. 2, a first embodiment of the audio/video synchronizer for a digital TV of the present invention comprises a system decoder 11 for parsing a system data packet and outputting compressed data of the audio and video signals and PTS/DTS and PCR or SCR, an audio/video decoder 13 for decoding the compressed data output from system decoder 11, outputting a DTS for the video or audio frame to be decoded, and outputting a decoding ready signal indicating that decoding of the video or audio frame is finished, and a PTS of corresponding data, a frame memory 14 for storing the audio/video data from audio/video decoder 13, a clock generator 15 made with a crystal oscillator for dividing an input clock into a predetermined value to generate horizontal and vertical sync signals Hsync and Vsync and PCM clock PCMclk of audio signal, an audio/video playing portion 16 for displaying the video data decoded in audio/video decoder 13 according to the decoding ready signal of audio/video decoder 13 and PTS signal in synchronization with the vertical and horizontal sync signals from clock generator 15, playing the decoded audio frame data in synchronization with the audio PCM clock of clock generator 15, and outputting the PTS of picture and the audio frame, and a PTS/DTS controller 12 for comparing the PTS input from audio/video playing portion 16 or the DTS from audio/video decoder 13 with the PCR or SCR input from system decoder 11, and controlling audio/video playing portion 16 so that, if their difference is within a predetermined reference value, the current state is played, and if the difference is out of the reference value, audio and video data of a predetermined frame is skipped or repeated in order to play quickly or slowly the audio and video signals.

Figure 3A:
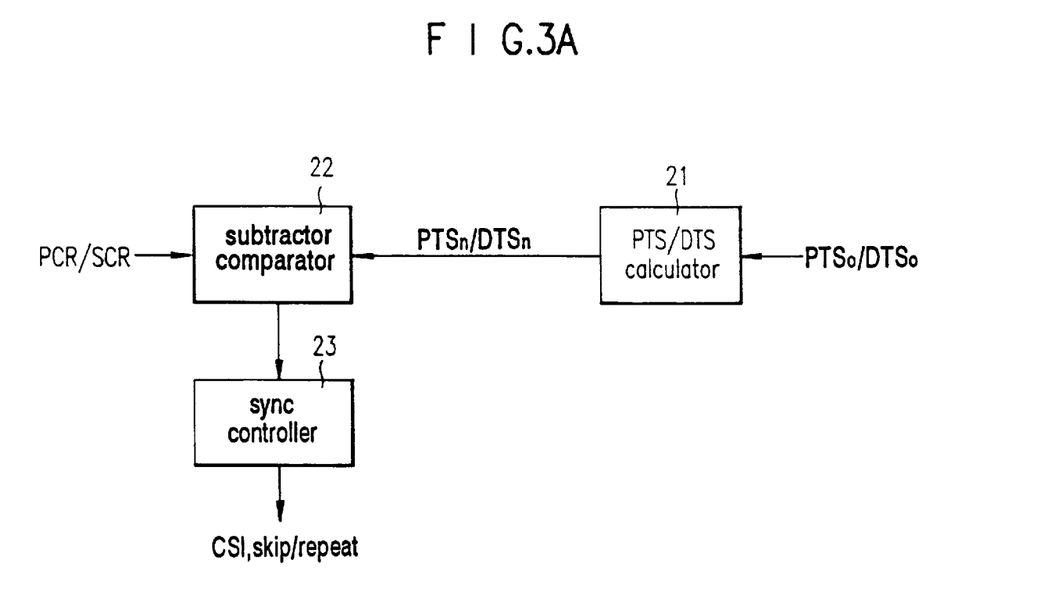
FIGS. 3A and 3B are block diagrams of the PTS/DTS controller shown in FIG. 2.

As shown in FIG. 3A, a first embodiment of PTS/DTS controller 12 comprises a PTS/DTS calculator 21 for receiving the PTS value $PTS_0$ of the first frame to which the PTS is input or the DTS value $DTS_0$ of the first frame to which the DTS is input, and obtaining the PTS value $PTS_n$ or DTS value $DTS_n$ input to a next frame (nth frame) after $PTS_0$ or $DTS_0$ of the first frame is input, thereby calculating the PTS or DTS value with respect to a picture or frame where the PTS or DTS is absent, a subtractor/comparator 22 for receiving PCR/SCR value from system decoder 11 and $PTS_n/DTS_n$ from PTS/DTS calculator 21 to compare them, and deciding whether their difference is within or out of a predetermined value, and a sync controller 23 for controlling audio/video decoder 13 and audio/video playing portion 16, according to the output signal of subtractor/comparator 22, to skip or repeat one frame of data.

Figure 3B:
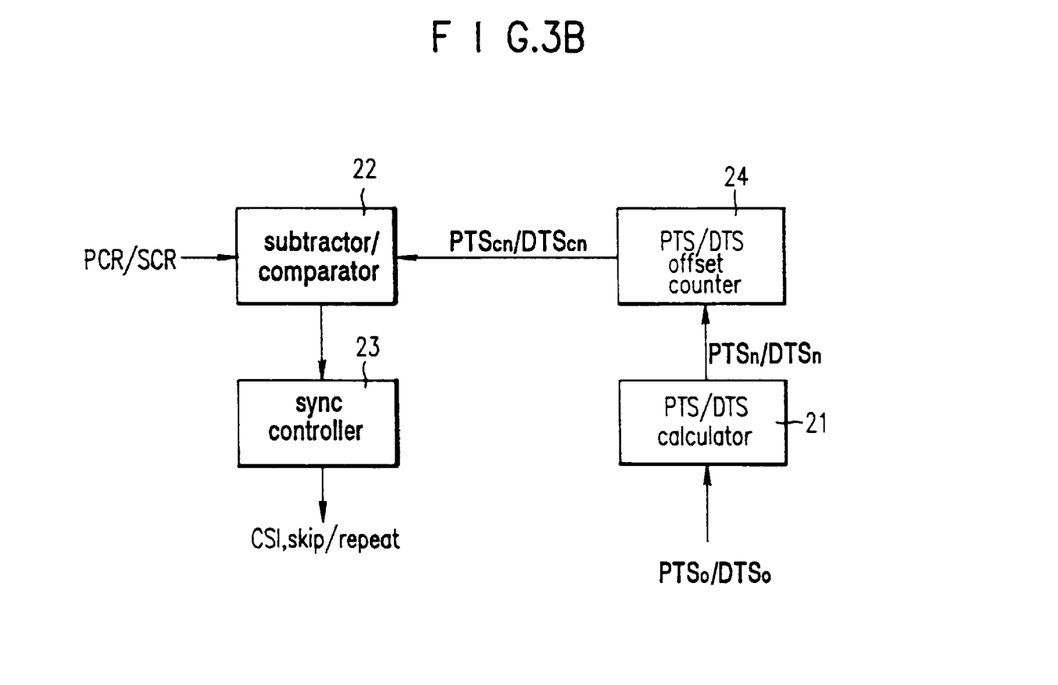

Referring to FIG. 3B, to the configuration of the first embodiment of PTS/DTS controller 12, a second embodiment of PTS/DTS controller 12 further comprises a PTS/DTS offset counter 24 for receiving $PTS_n/DTS_n$ value from PTS/DTS calculator 21 and counting the $PTS_n$ or $DTS_n$ until a new PCR or SCR is input, to thereby output counted value $PTS_{on}/DTS_{on}$.

In the first embodiment of the audio/video synchronizer for a digital TV of the present invention, a data packet is parsed in system decoder 11 to obtain compressed data, PTS or DTS and PCR or SCR. The compressed data and PTS or DTS are output to audio/video decoder 13. PCR or SCR is output to PTS/DTS controller 12.

Audio/video decoder 13 decodes the compressed data and stores it to frame memory 14. The DTS for the picture or audio frame to be decoded is transmitted to PTS/DTS controller 12. A decoding ready signal indicating that decoding is finished and the PTS value for corresponding data are transmitted to audio/video playing portion 16.

PTS/DTS controller 12 receives the DTS value from audio/video decoder 13 or PTS value from audio/video playing portion 16, which are compared with the PCR or SCR input from system decoder 11.

As a comparison result, if their difference is within a predetermined reference value, the current state is played continuously. Here, the video data is displayed in synchronization with the horizontal and vertical sync signals from clock generator 15. The audio data is played according to the audio PCM clock from clock generator 15.

Meanwhile, if the difference is out of the reference value, a control signal is output to control audio/video decoder 13 and audio/video playing portion 16 to skip or repeat one frame of data.

Audio/video decoder 13 and audio/video playing portion 16 skip or repeat an audio or video frame according to the control signal of PTS/DTS controller 12 in order to synchronize the video and audio signals. The operation of the first embodiment of PTS/DTS controller 12 will be explained below in more detail.

First, a system data packet has no PTS or DTS value for every frame. For frames having no PTS or DTS value, they must be calculated in PTS/DTS calculator 21.

More specifically, given that the distance between frames is $offset_{int}$, decoding delay is $offset_{delay}$, and the PTS and DTS values for the first frame to which the PTS or DTS value is input are $PTS_0$ and $DTS_0$, respectively, the $PTS_n$ and $DTS_n$ of nth frame which are input after $PTS_0$ and $DTS_0$ are calculated as follows.

$$PTS_n = PTS_0 + Offset_{int} * n$$

$$DTS_n = DTS_0 + Offset_{int} * n + Offset_{delay}$$

Here, a calculation example of $PTS_n$ will be explained with FIG. 4.

Figure 4:
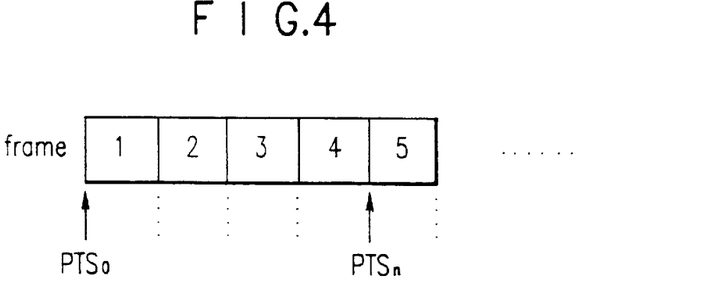
FIG. 4 is a diagram for illustrating the calculation of PTSn of the PTS/DTS calculator of FIG. 3.

In FIG. 4, when the PTS value is initially input in the first frame, the input $PTS_0$ is 1, the distance between frames is 1, and a frame to which the PTS/DTS value is input is fifth (=n) after the first frame, $PTS_n = PTS_0\ (=1) + \text{Offset}_{int}\ (=1) * (n=5) = 5$.

Subtractor/comparator 22 receives the PCR or SCR value from system decoder 11 and $PTS_n/DTS_n$ from PTS/DTS calculator 21, and compares them to decide whether their difference is within reference values Ref1 or Ref2.

In other words, $$Ref1 \leq PCR-PTS_n \leq Ref2$$

$$Ref1 \leq SCR-PTS_n \leq Ref2$$

$$Ref1 \leq PCR-DTS_n \leq Ref2$$

$Ref1 \leq SCR-DTS_n \leq Ref2$ are performed to the audio or video data.

Figure 5:
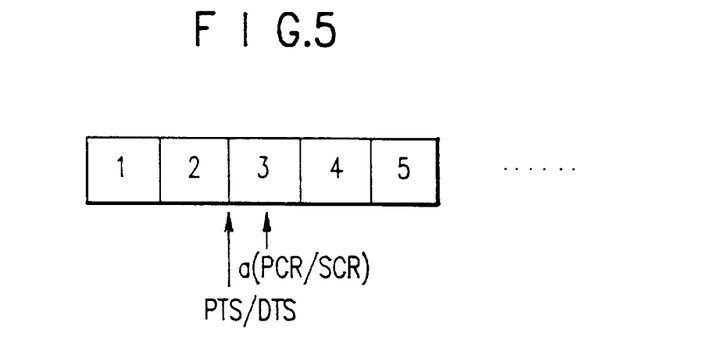
FIG. 5 is a diagram for illustrating the operation of the subtractor and comparator of FIG. 3.

Here, reference values Ref1 and Ref2 are the same value with different signal. Two reference values Ref1 and Ref2 are used because the decoding side, that is, the reception side, has a faster or slower clock than the encoding side, that is, the transmission side. In FIG. 5, when PTS/DTS value is 3, the PCR/SCR value is point A, and the clock of the decoding side is slower than that of the encoding side, point a may be 3.5. If the clock of the decoding side is faster than that of the encoding side, point a may become 2.5. Provided that reference value Ref1 is 31 1 and Ref2 is 1, referring to FIG. 5, when point a is 3.5 or 2.5, $PCR-PTS_n$ or $SCR-PTS_n$ and $PCR-DTS_n$ or $SCR-DTS_n$ are +0.5 or −0.5, which are all within the reference values. In this case, sync controller 23 continuously plays video and audio data as in the current state, without skip or repeat.

If $PCR-PTS_n$ or $SCR-PTS_n$ and $PCR-DTS_n$ or $SCR-DTS_n$ are not within reference values Ref1 and Ref2, sync controller 23 repeats the frame played in order to delay time, or skips the prior-to-decoding frame, to thereby perform synchronization.

Here, an absolute value is taken to $PCR-PTS_n$ or $SCR-PTS_n$ and $PCR-DTS_n$ or $SCR-DTS_n$, only the positive value of reference values Ref1 and Ref2 may be used for comparison.

The comparison of $PTS_n$ and $DTS_n$ with PCR or SCR is performed after the PCR or SCR is input from a point to be played or decoded. For this reason, comparison is not performed for every frame but according to how many times the PCR or SCR is input.

In the second embodiment of the PTS/DTS controller 12, PTS/DTC offset counter 24 receives the $PTS_n/DTS_n$ values from PTS/DTS calculator 21, and counts the $PTS_n$ or $DTS_n$ value unit a new PCR or SCR is input. The counted values $PTS_{on}/DTS_{on}$ are input to subtractor/comparator 22, to be compared with the PCR or SCR input from system decoder 11. Other operations are the same as the first embodiment of the PTS/DTS controller, which will not be described.

The second embodiment of the PTS/DTS controller ensures more precise sync control than the first embodiment because it compares the SCR or PCR with the value in which $PTS_n/DTS_n$ is counted.

Second Embodiment

Figure 6:
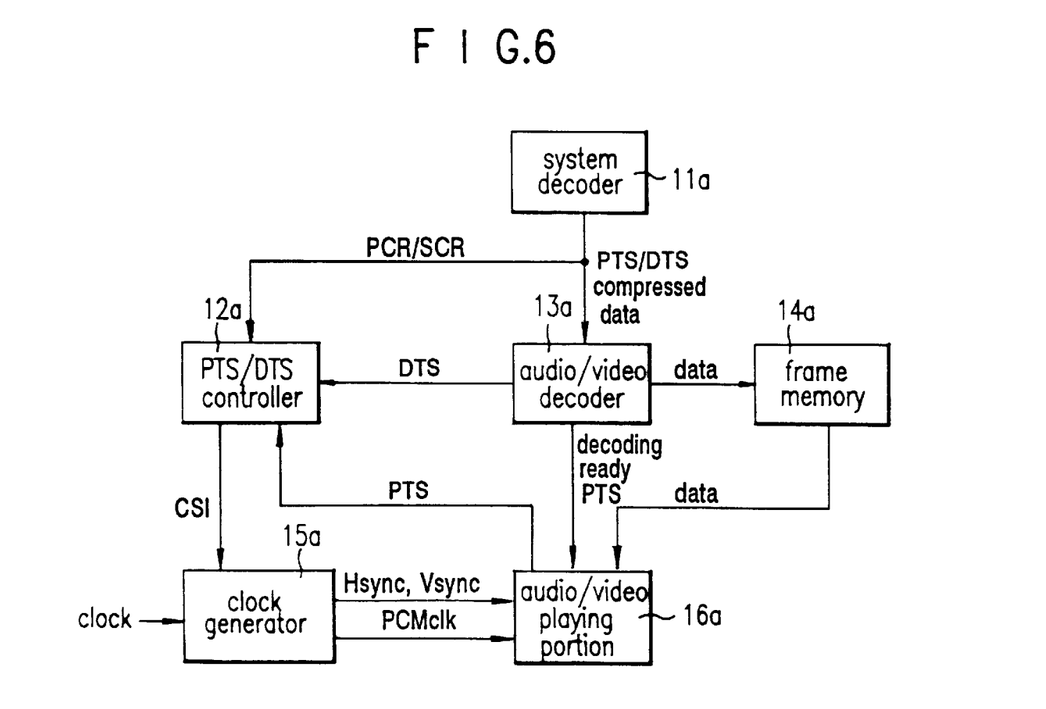
FIG. 6 is a block diagram of a second embodiment of the audio/video synchronizer for a digital TV of the present invention.

Unlike the first embodiment in which one frame of audio or video signal is skipped or repeated to synchronize them, the second embodiment of the audio/video synchronizer for a digital TV of the present invention varies the division value of clock generator 15a in PTS/DTS controller 12 in order to synchronize the audio and video signals.

As shown in FIG. 6, the second embodiment of the audio/video synchronizer for a digital TV of the present invention comprises a system decoder 11a for parsing a system data packet and outputting compressed data of the audio and video signals and PTS/DTS and PCR or SCR, an audio/video decoder 13a for decoding the compressed data output from system decoder 11a to output restored audio and video data, outputting a DTS for the video or audio frame to be decoded, and outputting a decoding ready signal indicating that decoding of the video or audio frame is finished, and a PTS of corresponding data, a frame memory 14a for storing the audio/video data from audio/video decoder 13a, a clock generator 15a for dividing an input clock into a predetermined value to generate horizontal and vertical sync signals Hsync and Vsync and PCM clock PCMclk of audio signal, an audio/video playing portion 16a for displaying the video data decoded in audio/video decoder 13a according to the decoding ready signal of audio/video decoder 13a and PTS signal in synchronization with the vertical and horizontal sync signals from clock generator 15a, playing the decoded audio frame data in synchronization with the audio PCM clock of clock generator 15a, and outputting the PTS of the picture and the audio frame, and a PTS/DTS controller 12a for comparing the PTS input from audio/video playing portion 16a or the DTS from audio/video decoder 13a with the PCR or SCR input from system decoder 11a, and controlling the clock division of clock generator 15a so that, if their difference is within a predetermined reference value, the current state is played, and if the difference is out of the reference value, a division control signal CS1 is output to clock generator 15a in order to synchronize the audio and video signals.

PTS/DTS controller 12a has the same configuration as the first and second embodiments of FIGS. 3A and 3B of the first embodiment of the audio/video synchronizer, which will not be explained in detail.

In the second embodiment of the audio/video synchronizer for a digital TV of the present invention, the operations of system decoder 11a, audio/video decoder 13a, frame memory 14a, and audio/video playing portion 16a are the same as those of the first embodiment, and will not be explained. However, the operations of PTS/DTS controller 12a and clock generator 15a will be described below.

First, PTS/DTS controller 12 compares the PTS input from audio/video playing portion 16a or the DTS value input from audio/video decoder 13a with the PCR or SCR value input from the system decoder 11a, and if their difference is within reference values Ref1 and Ref2, plays the current state. If the difference is out of the reference values, division control signal CS1 is output to clock generator 15a in order to control clock division.

Clock generator 15a divides input clock Clock according to the division control of PTS/DTS controller 12a so that horizontal and vertical sync signals Hsync and Vsync and audio PCM clock PCMclk are varied. In audio/video playing portion 16a, displaying of video signal and playing of audio signal are performed so that the video and audio signals are output in synchronization. Here, sync controller 23 of PTS/DTS controller 12a varies the division value of clock generator 15a according to the output of subtractor/comparator 22 in order to synchronize the audio and video signals.

In other words, of the frequency of horizontal sync=the frequency of input clock÷horizontal divider H.

the frequency of vertical sync=the frequency of input clock÷vertical divider V, and the frequency of PCM clock=the frequency of input clock÷audio divider A, divider H, divider V and divider A are rendered smaller or greater to vary the horizontal and vertical sync signals and PCM clock and thus synchronize the audio and video signals.

Meanwhile, in the PTS/DTS controller 12a, the operations of other components except sync controller 23 are the same as the first and second embodiments of the first embodiment of the audio/video synchronizer, and thus will not be explained.

Third Embodiment

Figure 7:
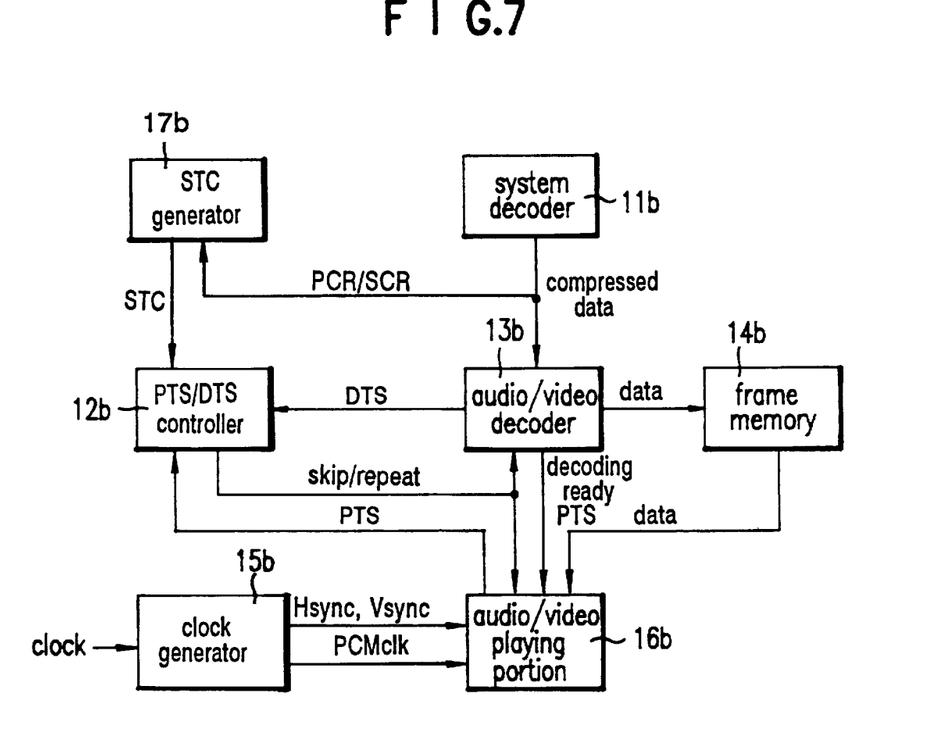
FIG. 7 is a block diagram of a third embodiment of the audio/video synchronizer for a digital TV of the present invention.

To the first embodiment of the audio/video synchronizer for a digital TV of the present invention, the third embodiment thereof further comprises an STC generator 17b. As shown in FIG. 7, STC generator 17b receives PCR or SCR value from system decoder 11b, counts the PCR or SCR, and outputs the counted value STC to PTS/DTS controller 12b. If a new PCR or SCR is input, the counted value is initialized to the input value, and then counting is started again.

Figure 8:
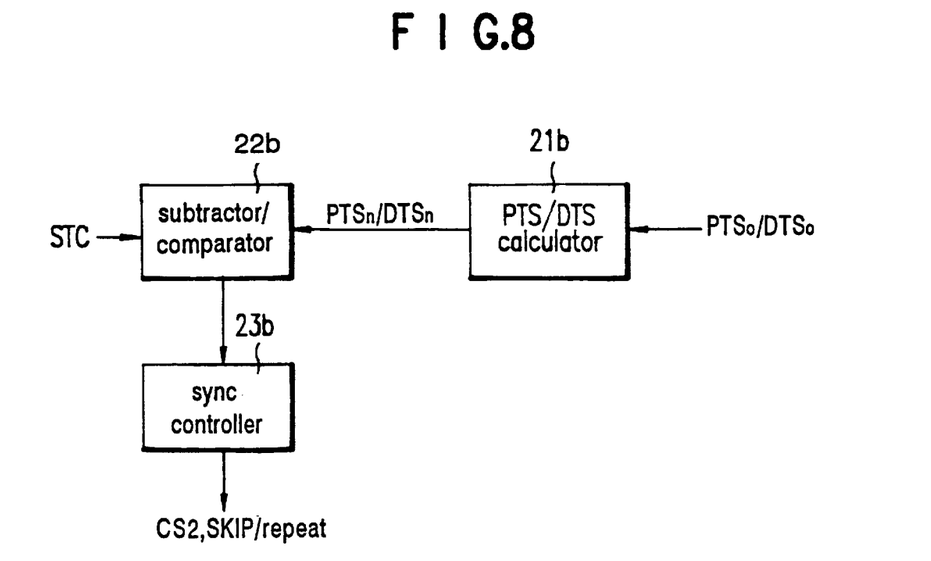
FIG. 8 is a block diagram of the PTS/DTS controller of FIG. 7.

PTS/DTS controller 12b is configured in the same way as the first embodiment of the first embodiment of the audio/video synchronizer of the present invention, as shown in FIG. 8.

In the third embodiment, PTS/DTS controller 12b compares the STC value input from STC generator 17b with the DTS value input from audio/video decoder 13b or the PTS value input from audio/video playing portion 16b so that according to the result, as in the first embodiment, audio/video decoder 13b and audio/video playing portion 16b skip or repeat one frame of data.

Subtractor/comparator 22b of PTS/DTS controller 12b compares the STC value input from STC generator 16b with the $PTS_n$ or $DTS_n$ input from PTS/DTS calculator 21, and if their difference between the STC value and $PTS_n$ and $DTS_n$ is within reference values Ref1 and Ref2, displays the current state. If the difference is out of reference values Ref1 and Ref2, sync controller 23b repeats the frame displayed for time delay, or skips the prior-to-decoding frame, for the purpose of synchronization.

In other words, $Ref1 \leq STC-PTS_n \leq Ref2$ or $Ref1 \leq STC-DTS_n \leq Ref2$ is performed with respect to the audio or video data. If $STC-PTS_n$ or $STC-DTS_n$ is not within reference values Ref1 and Ref2, sync controller 23b repeats the frame displayed for time delay or skips the prior-to-decoding frame in the same way as the first embodiment. By doing so, synchronization is carried out.

If an absolute value is taken to $STC-PTS_n$ or $STC-DTS_n$, only the positive value of reference values Ref1 and Ref2 may be used for comparison, which is the same as in the first embodiment. In case of comparing $PTS_n$ and $DTS_n$ with the STC, comparison is performed at a point to be played or decoded, as many as the number of frames and pictures. The same components of the third embodiment as those components of the first embodiment will not be discussed.

Fourth Embodiment

Figure 9:
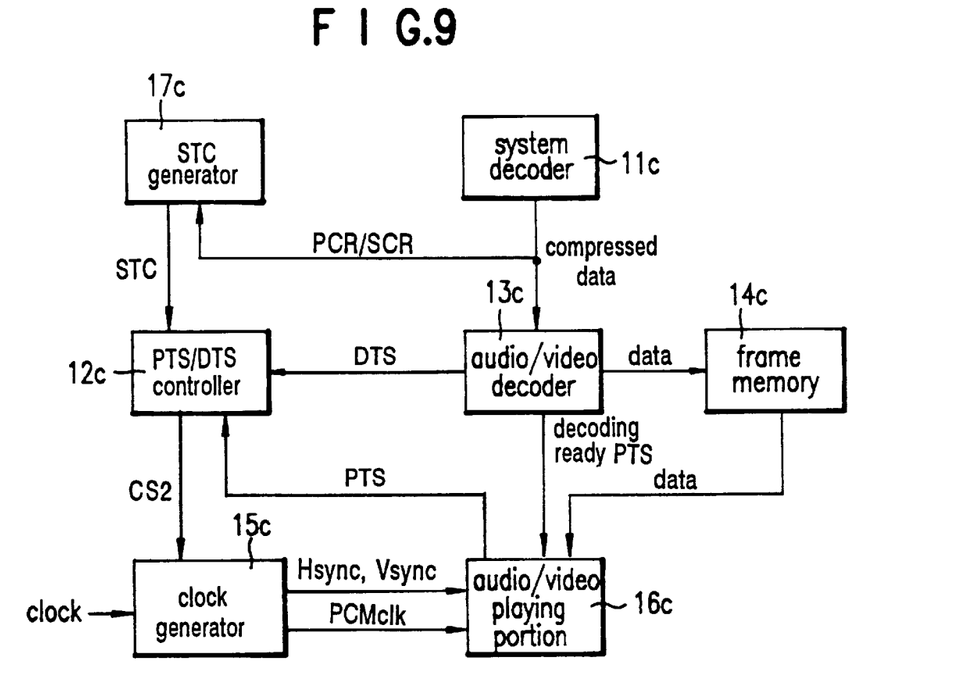
FIG. 9 is a block diagram of a fourth embodiment of the audio/video synchronizer for a digital TV of the present invention.

The fourth embodiment of the audio/video synchronizer for a digital TV of the present invention is constructed in such a manner that STC generator 17c is added to the second embodiment. As shown in FIG. 9, STC generator 17c is made in the same configuration as the third embodiment. PTS/DTS controller 12c of the fourth embodiment is made in the same configuration as PTS/DTC controller 12b of the third embodiment of FIG. 8.

In the fourth embodiment, PTS/DTS controller 12c compares the STC value input from STC generator 17c with the DTS value input from audio/video decoder 13c or the PTS value input from audio/video playing portion 16b, and if their difference is within reference values Ref1 and Ref2, plays the current state. If the difference is out of reference values Ref1 and Ref2, the controller controls the clock division of clock generator 15a.

Clock generator 15a divides the input clock Clock according to the control of the division value from PTS/DTS controller 12c, and varies horizontal and vertical sync signals Hsync and Vsync and PCM clock PCMclk of the audio signal so that displaying of video signal and playing of audio signal are performed in audio/video playing portion 16a. Through this process, the video and audio signals are synchronized.

Here, sync controller 23 of PTS/DTS controller 12c varies the division value of clock generator 15a according to the output of subtractor/comparator 22 in order to synchronize the audio and video signals. The sync controller operates in the same fashion as that of the second embodiment, which will not be explained.

The fourth embodiment of the present invention combines the second and third embodiments so that STC generator 17c functioning in the same way as the third embodiment is added. Then, the STC value of PTS/DTS controller 12c and the PTS or DTS are compared so that a division control signal CS2 is output to clock generator 15c as discussed in the second embodiment in order to vary the clock division value of clock generator 15c. By doing so, the synchronization control of audio and video signals is carried out.

Fifth Embodiment

Figure 10:
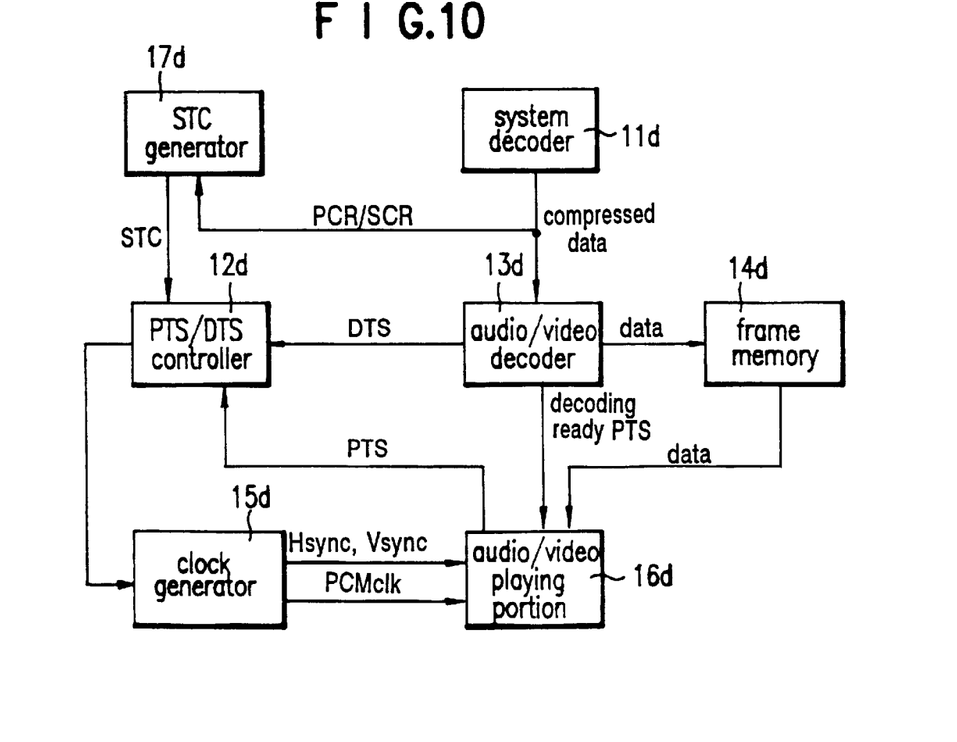
FIG. 10 is a block diagram of a fifth embodiment of the audio/video synchronizer for a digital TV of the present invention.

The fifth embodiment of the audio/video synchronizer for a digital TV of the present invention is constructed in the same way as the third and fourth embodiments, as shown in FIG. 10. PTS/DTS controller 12d compares the STC value of STC generator 17d with the DTS value of audio/video decoder 13d or the PTS value of audio/video playing portion 16d, and thus varies the input clock Clock of clock generator 16d. This varies the output of horizontal and vertical sync signals Hsync and Vsync and PCM clock PCMclk according to the fixed division value of clock generator 15d, performing the synchronization control of audio and video signals.

Figure 11:
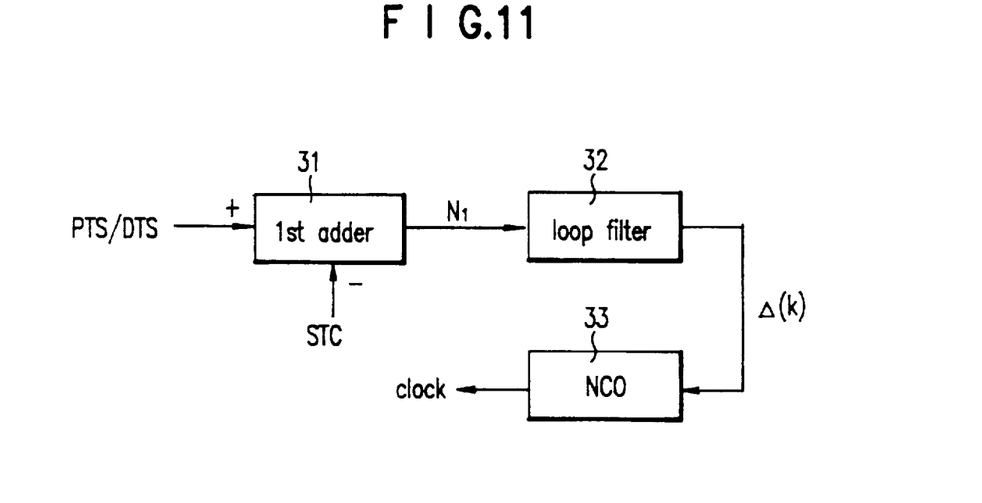
FIG. 11 is a block diagram of the PTS/DTS controller of FIG. 10.

PTS/DTS controller 12d of the fifth embodiment of the present invention, as shown in FIG. 11, comprises a first adder 31 for outputting an error signal for correcting the clock frequency of the reception side, that is, the difference between the DTS value of a picture or frame decoded from audio/video decoder 13d or the PTS value of the picture or frame played from audio/video playing portion 16d and the STC value input from STC generator 17d, a loop filter 32 for removing the jitter form the output of first adder 31, and a numerically controlled oscillator (NCO) 33 for receiving the output of loop filter 32 and tracing the clock of the encoding side.

Figure 12:
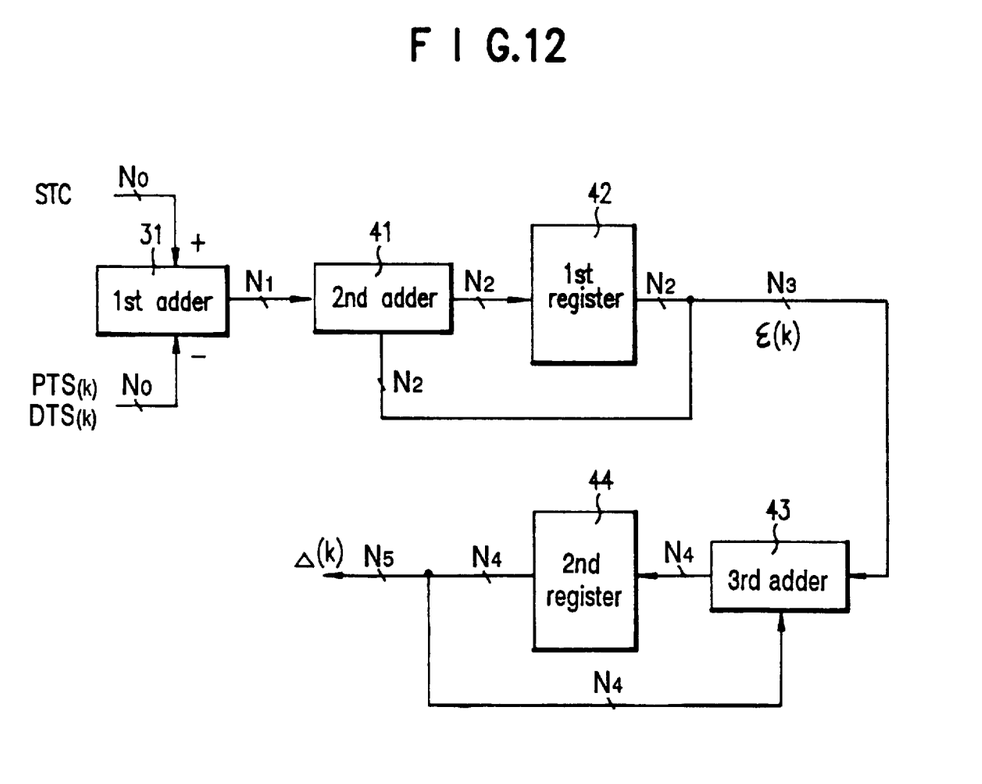
FIG. 12 is a detailed block diagram of the loop filter of FIG. 11.

Referring to FIG. 12, loop filter 32 comprises a second adder 41 for adding the data output from first adder 31 to the previous data, a first register 42 for temporarily storing and outputting the output of second adder 41 and simultaneously feeding it back to one input port of second adder 41, a third adder 43 for adding the output of first register 42 to the previous output, and a second register 44 for temporarily storing the output of the third adder and feeding it back to one input port of third adder 43.

Figure 13A:
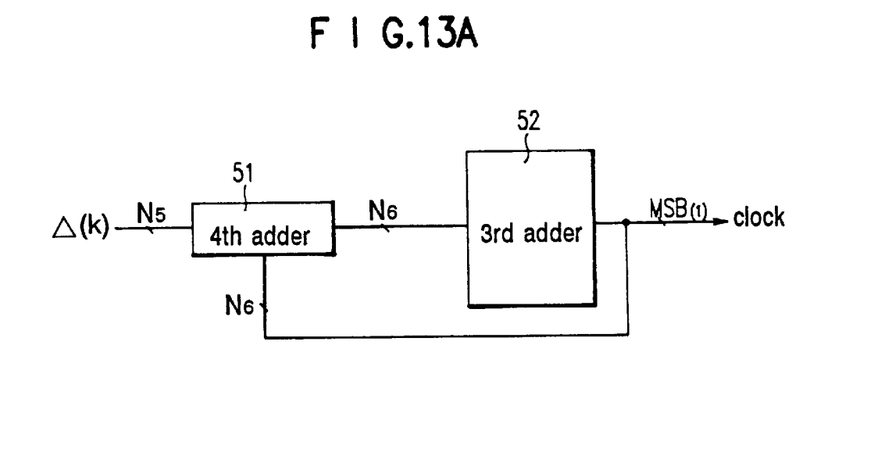
FIGS. 13A and 13B are block diagrams of first and second embodiments of the NCO of FIG. 11.

As shown in FIG. 13A, the first embodiment of NCO 33 comprises a fourth adder 51 for adding the data output from loop filter 32 to the previous output data, and a third register 52 for temporarily storing the output of fourth adder 51 to output its MSB and simultaneously feed it back to one input port of fourth adder 51.

Figure 13B:
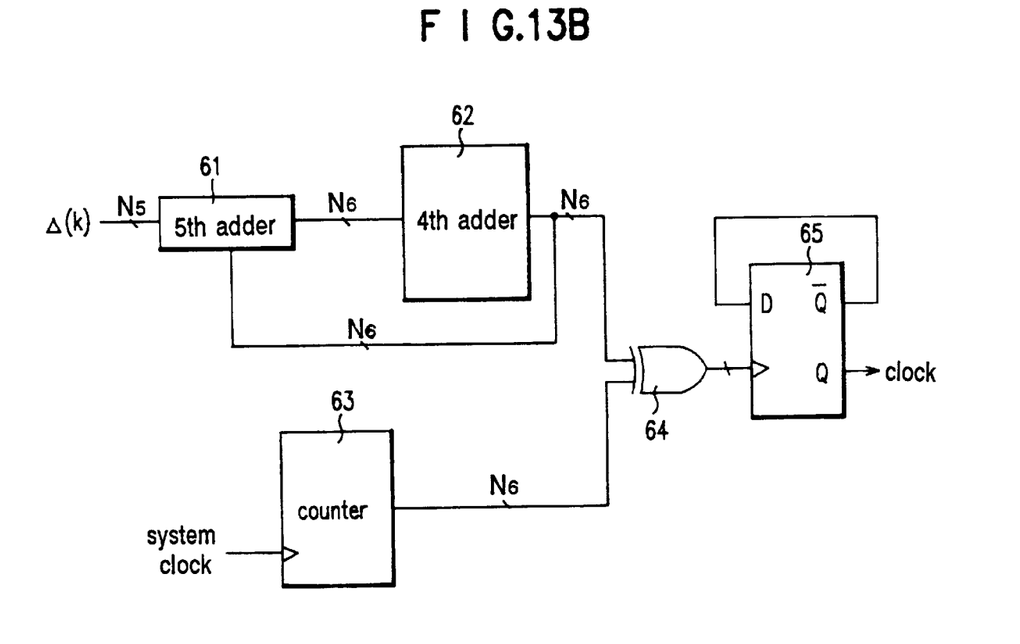

Referring to FIG. 13B, the second embodiment of NCO 33 comprises a fifth adder 61 for adding the data output from loop filter 32 to the previous output data, a fourth register 62 for temporarily storing and outputting the output of fifth adder 61 and simultaneously feeding it back to one input port of fifth adder 61, a counter 63 for repeating counting as many as the number of set bits and outputting the result, an EXCLUSIVE-OR gate 64 for EXCLUSIVE-OR-operating the output of fourth register 62 and the output of counter 63, and a T flipflop 65 for toggling and outputting the output of EXCLUSIVE-OR gate 64.

The operation of the fifth embodiment of PTS/DTS controller 12d of the present invention will be described below.

First, on the encoding side, the PTS/DTS is transmitted once at least in 0.1 second. So, given the PTS/DTS value received Kth is $PTS_{(K)}/DTS_{(K)}$, first adder 31 obtains error information of N1 bit from the received $PTS_{(K)}/DTS_{(K)}$ and STC value, that is, the difference between $PTS_{(K)}/DTS_{(K)}$ and STC value. The error information output of N1 bit of first adder 31 is continuously accumulated through second adder 41 and first register 42 of loop filter 32, thereby obtaining error component $\xi_{(K)}$ of N3 bit from which jitter is removed. Here, the number of the output bit N2 of first register 42 and the number of the input bit n3 of the third adder 43 are not the same.

Third adder 43 and second register 44 form a new error value $\Delta_{(K)}$ from error component $\xi_{(K)}$ and frequency error value $\Delta_{(K-1)}$ of the previous state. Here, new error value $\Delta_{(K-1)}$ is calculated at a point where $PTS_{(K)}/DTS_{(K)}$ is received.

In the first embodiment of NCO 33, as the system clock frequency, the value of third register 52 of N6 bit determined by the clock frequency of the system is added to the output $\Delta_{(K)}$ of loop filter 32 in fourth adder 51 in order to output the MSB. Through this procedure, a clock waveform in which the frequency offset of $\Delta_{(K)}$ is compensated for is obtained.

In the second embodiment of the NCO shown in FIG. 13B, fourth adder 51 operates at the system clock frequency so that fifth adder 61 operates only when the PTS/DTS is received.

Using counter 63 of N6 bit, at a point where the value of fourth register 62 reaches a predetermined value (N6 bit), fourth register 62 is updated by EXCLUSIVE-OR gate 64 if the value of counter 63 and the value of fourth register 62 are the same. Through T flipflop 65, a clock is generated.

Here, fourth register 62 is updated by EXCLUSIVE-OR gate 64 if the value of counter 63 and the value of fourth register 62 are the same as that fifth adder 61 may be slower than fourth adder 51 in performance speed.

As described above, in the first and third embodiments of the present invention, if the PTS or DTS and PCR/SCR or STC are compared and their difference is within a predetermined value, PTS/DTS controllers 12 and 12b operate in the current state. If the difference is out of the reference value, one frame of audio or video data is skipped or repeated in controlling their synchronization.

In the second and fourth embodiments of the present invention, if the PTS or DTS and PCR/SCR or STC are compared and their difference is within a predetermined value, PTS/DTS controllers 12a and 12c operate in the current state. If the difference is out of the reference value, the division value of clock generators 15a and 15c is varied to control the speed of the horizontal and vertical sync signals and the audio PCM clock. By doing so, the synchronization of the audio and video signals is controlled.

In the fifth embodiment, if the PTS or DTS and STC are compared and their difference is within a predetermined value, PTS/DTS controllers 12d operate in the current state. If the difference is out of the reference value, the input clock of clock generators 15d is varied to control the speed of the horizontal and vertical sync signals and the audio PCM clock. By doing so, the synchronization of the audio and video signals is controlled.

As described above, the present invention requires no VCO and D/A converter, reducing its production cost. In addition, the present invention is made in a digital form so that it may become ASIC using a super-density technology. Further, using no VCO, the present invention can vary a separate clock in synchronizing audio and video signals so that it can be employed to all the audio/video signal processing systems made in the MPEG standard.

What is claimed is:

1. An audio/video synchronizer for a digital TV comprising:

a system decoder for parsing an input data packet and outputting compressed data of audio and video signals and PTS/DTS and PCR or SCR;

an STC generator for receiving and counting PCR or SCR from said system decoder to thereby output an STC value;

an audio/video decoder for decoding the compressed data output from said system decoder, outputting a DTS for the video or audio frame to be decoded, and outputting a decoding ready signal indicating that decoding of the video or audio frame is finished, and a PTS of corresponding data;

a frame memory for storing the audio/video data from said audio/video decoder;

a clock generator for dividing an input clock according to a division value to generate horizontal and vertical sync signals and a PCM clock of the audio signal;

an audio/video playing portion for laying the data decoded in said audio/video decoder according to the decoding ready signal in synchronization with the vertical and horizontal sync signals from said clock generator and the audio PCM clock, and outputting the PTS of a picture played and the audio frame to said PTS/DTS controller; and a PTS/DTS controller for comparing the PTS input from said audio/video playing portion or the DTS from said audio/video decoder with the STC input from said STC generator, thereby controlling said audio/video decoder and audio/video playing portion according to their difference.

2. An audio/video synchronizer for a digital TV as claimed in claim 1, wherein said PTS/DTS controller comprises:

a PTS/DTS calculator for calculating the PTS or DTS value from the first frame to which the PTS/DTS is input to an nth frame to which the PTS/DTS is input subsequently;

a subtractor/comparator for receiving the STC value from said STC generator and the nth PTS/DTS from said PTS/DTS calculator, and subtracting them to decide whether their difference is within or out of a predetermined value; and a sync controller for, according to the output signal of said subtractor/comparator, controlling said audio/video decoder and audio/video playing portion to skip or repeat a frame of data.

3. An audio/video synchronizer for a digital TV as claimed in claim 2, wherein, given that the distance between frames is $Offset_{int}$, decoding delay is $Offset_{delay}$, and the PTS and DTS values for the first frame to which the PTS or DTS value is input are $PTS_0$ and $DTS_0$, respectively, the PTS input to an nth frame after the first frame is calculated in $PTS_n = PTS_0 + Offset_{int} = n$, and the DTS is calculated in $DTS_n = DTS_0 + Offset_{int} * n + Offset_{delay}$.

4. An audio/video synchronizer for a digital TV as claimed in claim 2, wherein said sync controller controls so that data is skipped or repeated in units of frame.

* * * * *

Disclaimer

5,771,075 — Chai Yeol Rim, Seoul, Rep. of Korea; Yong Hoon Kim, Seoul, Rep. of Korea. AUDIO/VIDEO SYNCHRONIZER. Patent dated June 23, 1998. Disclaimer filed April 15, 2008, by the inventors.

Hereby enters this disclaimer to all claims of said patent.

*(Official Gazette, April 7, 2009)*